United States Patent

[11] 3,590,418

| [72] | Inventor | Helmut G. Hoeschel<br>Newark, Del. |
|---|---|---|
| [21] | Appl. No. | 769,222 |
| [22] | Filed | Oct. 21, 1968 |
| [45] | Patented | July 6, 1971 |
| [73] | Assignee | Improved Machinery Inc.<br>Nashua, N.H. |

[54] MOLDING MACHINE
7 Claims, 5 Drawing Figs.

[52] U.S. Cl. .................................................. 18/30 LA, 18/30 LE
[51] Int. Cl. ................................................... B29f 1/00
[50] Field of Search .......................................... 18/30 LA, 30 LC, 30 LM, 30 LT, 30 LV, 30

[56] References Cited
UNITED STATES PATENTS

| 3,160,919 | 12/1964 | Carter | 18/30 (LM) X |
| 3,184,810 | 5/1965 | Hoern | 18/30 (LM) X |
| 3,279,004 | 10/1966 | Hartman et al. | 18/30 (LM) X |

FOREIGN PATENTS

| 888,184 | 1/1962 | Great Britain | 18/30 (LA) |

Primary Examiner—H. A. Kilby, Jr.
Attorneys—Carl R. Horten, David W. Tibbott and Robert R. Paquin

ABSTRACT: An injection molding machine comprising a first platen mounted upon a base, a second platen suspended from a supporting frame by shoe means, and cylinder-and-piston means connected to the supporting frame and to the second platen for driving the second platen and shoe means relative to the first platen.

A plurality of tie rods mounted to one of the platens longitudinally project therefrom towards the other platen; and the latter is provided with clamping means which apply the clamping force through the tie rods.

INVENTOR
HELMUT G. HOESCHEL

INVENTOR
HELMUT G. HOESCHEL
BY
Robert L. Paquin
ATTORNEY 3,590,418

MOLDING MACHINE

BACKGROUND OF THE INVENTION

The present invention relates to molding machines and more particularly to molding machines such as employed for the injection molding of plastic articles.

Conventionally, molding machines of this type normally include relatively movable pressure platens carrying mold sections which are cooperative to form a therein charge of plastic into one or more plastic articles. These pressure platens are generally, in the instance of the smaller machines, supported adjacent their upper and lower ends by tie rods and, in the case of the larger machines wherein the clamping force may exceed one thousand tons, mounted upon a ground supported base. The mounting of both of the platens of such larger machines upon a ground supported base is, however, believed to be undesirable in that it limits the speed of the operating cycle of the machines by necessitating that the operator move between the mold sections, when the platens are in an open position, to remove each formed article. Moreover, in such machines mold installation and maintenance is frequently difficult due to limited accessibility to the mold area between the platens.

SUMMARY OF THE INVENTION

An object of the present invention is to provide a new and improved molding machine which is particularly constructed and arranged to facilitate the removal of the articles formed thereby.

Another object of the invention is to provide a new and improved molding machine which is particularly constructed and arranged to permit automatic removal of such articles.

Another object is to provide a new and improved molding machine which is particularly constructed and arranged to facilitate accessibility to the platens and the mold area therebetween.

In general, these objects, and those other objects and advantages which will be apparent from the following description taken in connection with the accompanying drawings, are attained by the provision of a molding machine broadly considered comprising a pair of oppositely disposed relatively movable platens, a supporting frame including a platen supporting portion adjacent the upper end of one of the platens and in spaced relation to the ground, shoe means suspending such one platen from the supporting portion, and drive means for causing relative movement of the platens, one of such platens being provided with a plurality of tie rods longitudinally projecting towards the other platen and said other platen having clamping means for applying the clamping force through the tie rods.

DESCRIPTION OF THE PREFERRED EMBODIMENTS

Figure 2:
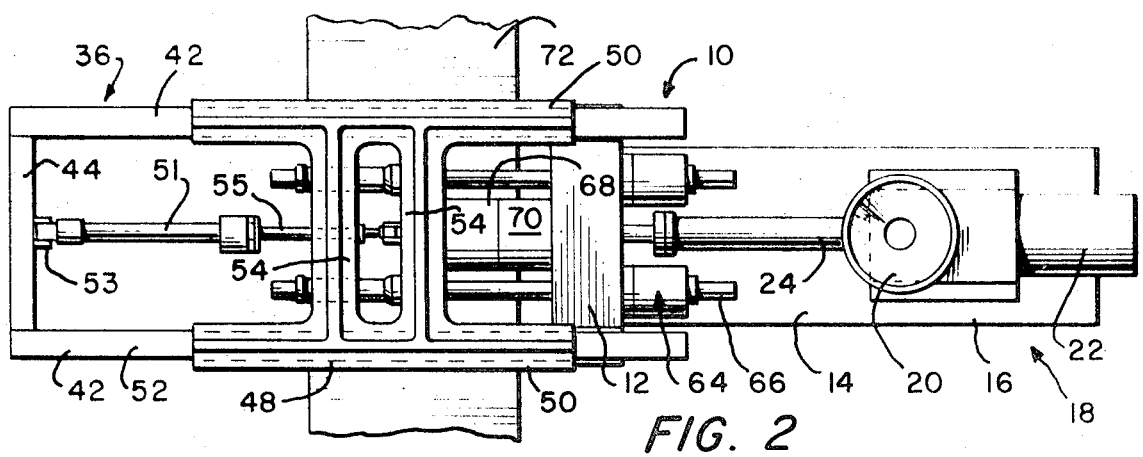
FIG. 2 is a top or plan view of the injection molding machine shown in FIG. 1.
Figure 1:
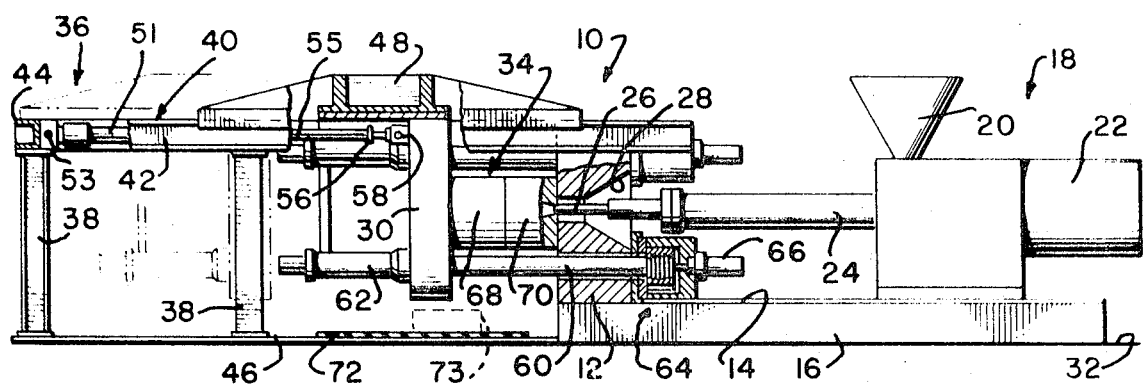
FIG. 1 is an elevational view, partially broken away and in section, of an injection molding machine constructed in accordance with one embodiment of the invention.
Figure 3:
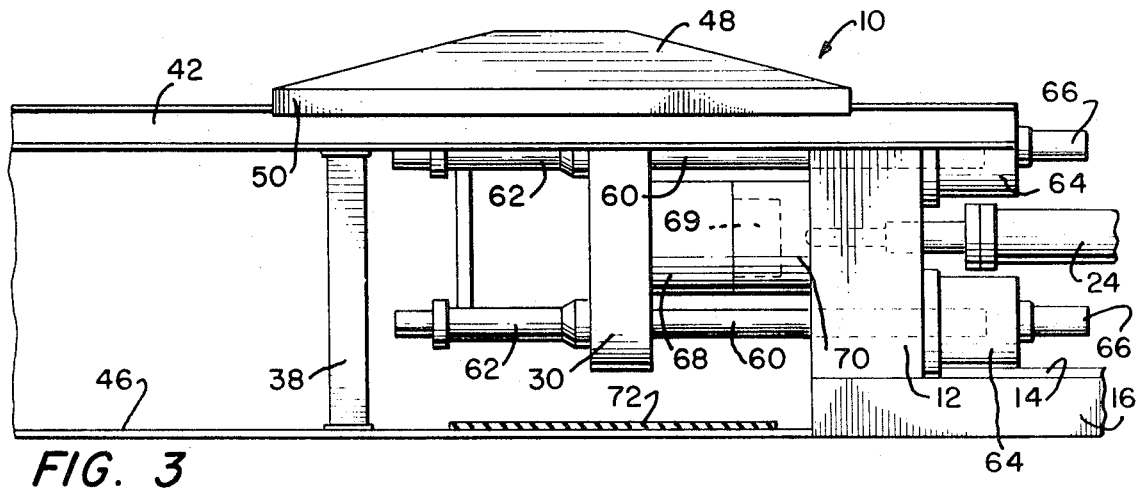
FIG. 3 is an enlarged, fragmentary, elevational view of the molding machine showing such with the mold closed.
Figure 4:
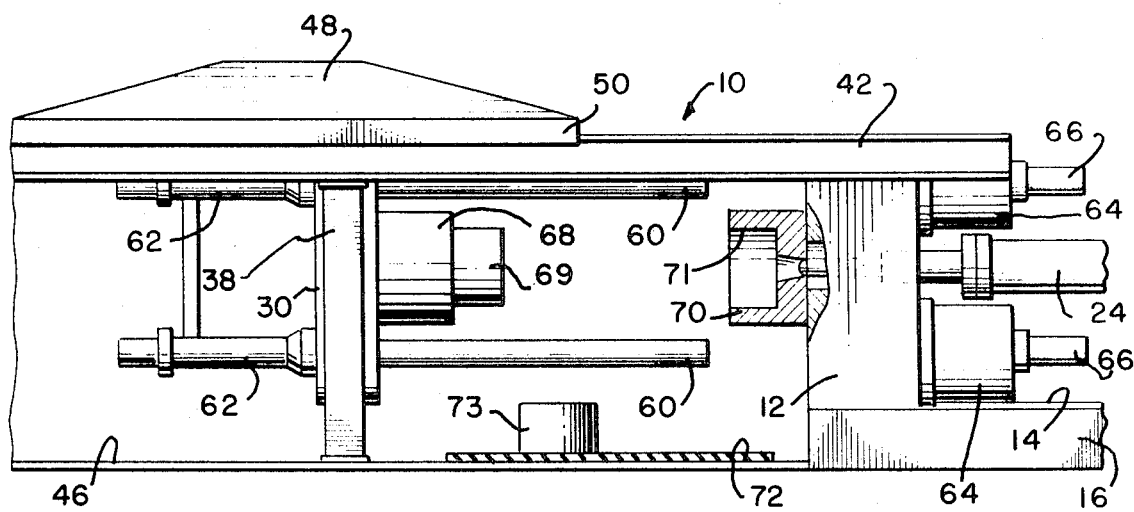
FIG. 4 is a view generally similar to that of FIG. 3, but showing the machine with the mold open.

Referring more particularly to the drawings wherein similar reference characters designate corresponding parts throughout the several views, and with particular reference to FIGS. 1—4, 10 generally designates an injection molding machine constructed in accordance with one embodiment of the present invention.

The molding machine 10 comprises a generally vertical, first or fixed platen 12 which is mounted upon the upper surface 14 of a generally horizontal, ground mounted base or base pad 16. The base 16 also carries the injection unit of the machine 10 which is designated generally as 18. The injection unit 18, per se, may be of any suitable conventional construction and, as illustrated, includes a receiving hopper 20, an injection ram device 22, a plasticizing and feed device 24, and a discharge nozzle 26 which projects through an opening 28 formed through the first platen 12.

The molding machine 10 also comprises a generally vertical, second or movable platen 30 which is oppositely disposed to the first platen 12 and arranged to be driven towards and away from the latter. The second platen 30, as illustrated, is suspended in spaced relation to the ground 32 to facilitate the removal of articles formed by the machine 10 and to also facilitate access to the platens 12, 30 and to the mold area 34 therebetween. More particularly, as illustrated in FIGS. 1 through 4, the machine 10 is provided with a platen supporting frame, designated generally as 36, which is formed from a plurality of generally vertical supporting posts 38 and a generally horizontal guide track 40 ground mounted by the supporting posts 38. The guide track 40 is arranged to extend towards the first platen 12 in spaced relation to the ground 32, and adjacent the upper end of the second platen 30, and comprises a pair of horizontally spaced track sections 42 which are carried by the supporting posts 38 and the upper end of the first platen 12. The track sections 42 are interconnected by crossbracing 44 such that the supporting frame 36 is of a unitary, rigid construction; and a sole or base plate 46 is preferably disposed below the supporting frame 36 and beneath the supporting posts 38 thereof.

A shoe means, shown as a supporting shoe 48, is slidably mounted on the guide track 40 for movement towards and away from the fixed platen 12. The illustrated supporting shoe 48, more particularly, comprises a pair of elongated slides 50, each slidably mounted on the upper surface of slideway 52 of a corresponding one of the track sections 42, which are interconnected by crossbracing 54 such that the supporting shoe 48 is of unitary construction and generally "H"-like configuration. The supporting shoe 48 is fixedly connected to the upper end of the second platen 30 whereby the second platen 30 is suspended from the guide track 40 to cause the latter to provide the sole support for such second platen; and the supporting shoe 48 and second platen 30 are conjointly movable towards and away from the first platen 12.

The second platen 30 and supporting shoe 48 are driven towards and away from the first platen 12, during the operation of the machine 10, by a fluid operated cylinder-and-piston means which is positioned intermediate the track sections 42 of the guide track 40. This cylinder-and-piston means, as illustrated, comprises a cylinder 51 pivotally connected at 53 to the crossbracing 44 of the supporting frame 36, and a piston 55 including a piston head (not shown) slidably in the cylinder 51 and an extensible piston rod 56 pivotally connected at 58 to the upper end of the second platen 30. The piston rod 56 could, as will be understood, alternatively be connected to the supporting shoe 48; and the connections of the cylinder 51 and piston 55 could be reversed whereby the piston rod 56 is connected to the supporting frame 36. The cylinder 51 is in a conventional manner connected to a suitable pressurized source of either hydraulic or pneumatic fluid and is double acting, whereby the cylinder-and-piston means is operable to both drive the second platen 30 and supporting shoe 48 towards the first platen 12 and also draw such from the latter.

The second platen 30 carries four tie rods 60 which project from the second platen 30 towards the first platen 12 and are slidably received by such platen 12. The tie rods 60 each extend through the second platen 30 into retraction tubes 62 mounted on the second platen 30, and are in the manner disclosed in U.S. Pat. Application Ser. No. 645,156, filed June 12, 1967, U.S. Pat. No. 3,465,387, entitled TWO STAGE CLAMPING MACHINE, adjustable by drive means (not shown) on the second platen 30 to vary the lengths of their portions projecting from the second platen 30 towards the first platen 12. The first platen 12 is provided with a clamping pad-and-load cell arrangement 64 and fluid operated push back cylinder 66 for each of the tie rods 60, such apparatus being also of the construction described in said application Serial No. 645,156. The clamping pad-and-load cell arrangements 64 serve during the operation of the molding machine 10 to clamp the ends of the tie rods 60 and apply the final clamping force to the second platen 30; the push back cylinders 66 serve during the operation of the molding machine 10 to absorb shock as the clamping pad-and-load cell arrangements 64 clamp the tie rods 60 and also assist in the initial movement of the second platen 30 from the first platen 12 when the mold is opening.

In the operation of the machine 10, mold sections 68, 70, (having a core 69 and a cavity 71, respectively) cooperative to form a charge of plastic into at least one plastic article 73, are affixed on the adjacent faces of the platens 12, 30. During each operating cycle of the machine, the supporting shoe 48 and second platen 30 are driven by the aforedescribed cylinder-and-piston means towards the first platen 12. When the mold sections 68, 70 are in contact with each other, the clamping pad-and-load cell arrangements 64 apply the final clamping force, and plastic is injected through the nozzle 26 of the injection unit 18. Thereafter, the clamping pad-and-load cell arrangements 64 are disengaged, and the second platen 30 with its attached mold section 68 moves away from the first platen 12 to the position shown in FIG. 4 and dotted in FIG. 1. The formed article 73 falls from between the mold sections 68, 70 when the latter are pulled apart and may be automatically removed from the machine 10 by an endless belt conveyor 72 or other suitable means, positioned below the mold area 34.

Figure 5:
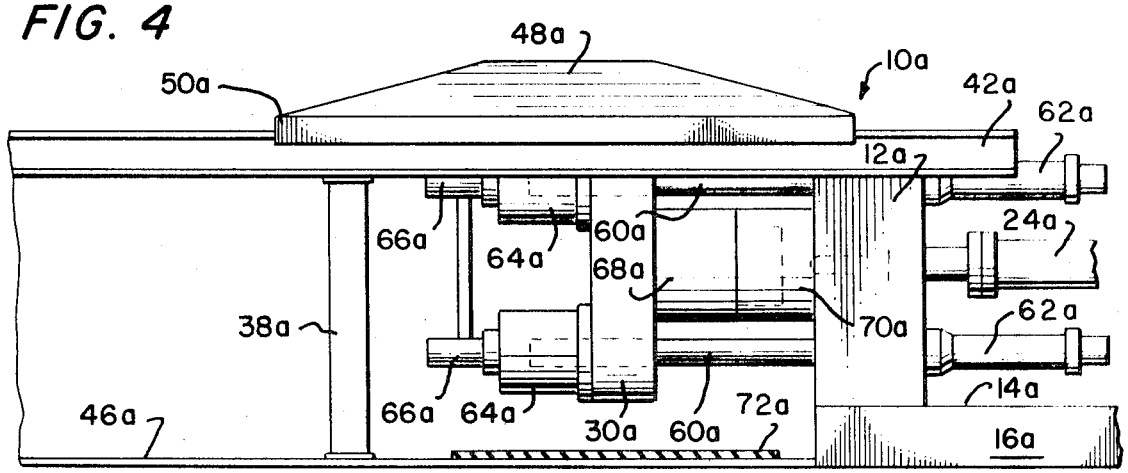
FIG. 5 is a fragmentary, elevational view of an injection molding machine constructed in accordance with an alternative embodiment of the invention.

FIG. 5, wherein illustrated parts similar to those described with reference to the molding machine 10 are designated by the reference character of the previously described similar part followed by the suffix a, illustrates an injection molding machine 10a constructed in accordance with another embodiment of the invention. The molding machine 10a, as will be understood, is of a construction identical to that of the molding machine 10 except as hereinafter otherwise specifically described. More particularly, the molding machine 10a is different from the molding machine 10 in that in the former the four tie rods 60a are carried by the first platen 12a and are slidably received by the second platen 30a. The retraction tubes 62a are mounted on the first platen 12a as is also the means for adjusting the tie rods 60a to vary the lengths of their portions projecting form the first platen 12a towards the second platen 30a. Moreover, in the molding machine 10a the second platen 30a carries the clamping pad-and-load cell arrangements 64a and the fluid operated push back cylinder 66a.

The operation of the molding machine 10a is believed to be apparent from the aforedescribed description of the operation of the molding machine 10.

From the preceding description it will be seen that I have provided a new and improved molding machine which is particularly constructed and arranged to facilitate access to the mold area between the platens and also to facilitate assembly of the platens to the remainder of the machine. It will, moreover, be seen that, as the space below the mold area of this machine is substantially unobstructed, this machine is also particularly adapted for permitting automatic removal of the articles which it forms, and does not require manual removal of such articles.

From the aforegoing it will be seen that I have provided new and improved means for accomplishing all of the objects and advantages of my invention It will be understood, however, that, although I have illustrated and hereinbefore specifically described only two embodiments of my invention, the invention is not limited merely to these two embodiments, but rather contemplates other embodiments and variations within the scope of the following claims.

Having thus described my invention, I claim:

1. In a molding machine, a generally vertical first platen, a generally vertical second platen oppositely disposed to said first platen, a supporting frame including a guide track which extends generally horizontally towards said first platen adjacent the upper end of said second platen and in spaced relation to the ground, shoe means supported by said guide track for movement along the latter towards and away from said first platen, said second platen being connected to said shoe means for conjoined movement therewith and suspended by said shoe means from said guide track whereby the suspension of said second platen provides the sole support therefor, a plurality of tie rods mounted to one of said platens and longitudinally projecting from such one platen towards the other thereof, drive means for driving said second platen and shoe means to move said second platen towards and away from said first platen, said tie rods being of lengths to be longitudinally spaced from said other of said platens by the driven movement of said second platen away from said first platen, and clamping means operatively associated with said other of said platens for receiving said tie rods and applying clamping force to said second platen through said tie rods.

2. A molding machine according to claim 1, wherein said tie rods are carried by said second platen.

3. A molding machine according to claim 1, wherein said tie rods are mounted to said first platen and said clamping means is mounted to said second platen.

4. A molding machine according to claim 1, wherein said supporting frame further includes a plurality of supporting posts ground mounting said guide track at locations spaced longitudinally of the latter.

5. A molding machine according to claim 1, wherein said drive means comprises fluid operated cylinder-and-piston means connected at one end to said supporting frame and at the other end to one of said shoe means and second platen.

6. A molding machine according to claim 1, wherein said drive means comprises fluid operated cylinder-and-piston means including a cylinder connected at one end to said supporting frame and a piston in said cylinder, said piston being provided with a piston rod which projects from the other end of said cylinder and is connected to one of said shoe means and second platen.

7. A molding machine according to claim 6, wherein said guide track includes a plurality of horizontally spaced apart track sections interconnected by crossbracing and ground mounted by supporting posts, said one end of said cylinder being connected to said crossbracing.